(12) United States Patent  (10) Patent No.: US 7,889,412 B2
Futatsuya et al.  (45) Date of Patent: Feb. 15, 2011

(54) ELECTROOPTICAL APPARATUS, ELECTRONIC DEVICE, AND APPARATUS AND METHOD FOR DETECTING OUTSIDE LIGHT

(75) Inventors: Masatoshi Futatsuya, Ichinomiya (JP); Kenichi Tajiri, Ichinomiya (JP); Yutaka Ozawa, Minowa-cho (JP)

(73) Assignee: Sony Corporation, Tokyo (JP)

( * ) Notice: Subject to any disclaimer, the term of this patent is extended or adjusted under 35 U.S.C. 154(b) by 279 days.

(21) Appl. No.: 12/260,487

(22) Filed: Oct. 29, 2008

(65) Prior Publication Data

US 2009/0141332 A1   Jun. 4, 2009

(30) Foreign Application Priority Data

Dec. 3, 2007   (JP)   ............................. 2007-312053

(51) Int. Cl.
*G02B 26/00*   (2006.01)
(52) U.S. Cl. ....................... 359/245; 359/296
(58) Field of Classification Search .................. 359/245
See application file for complete search history.

(56) References Cited

U.S. PATENT DOCUMENTS 6,975,008 B2   12/2005   Cok
2008/0272999 A1*   11/2008   Kurokawa et al. ............ 345/89

2009/0279078 A1*   11/2009   Wang ........................ 356/213

FOREIGN PATENT DOCUMENTS

| JP | A-2000-131137 | 5/2000 |
|---|---|---|
| JP | A-2006-243655 | 9/2006 |
| JP | A-2007-072243 | 3/2007 |
| JP | A-2007-511751 | 5/2007 |

\* cited by examiner

*Primary Examiner*—Jordan M. Schwartz
*Assistant Examiner*—James C Jones
(74) *Attorney, Agent, or Firm*—K&L Gates LLP

(57) ABSTRACT

An electrooptical apparatus includes a display unit that emits display light, a light emission stopping unit that stops emission of the display light in the display unit, a light receiving unit that receives outside light around the display unit while emission of the display light is stopped, an accumulating unit that accumulates the amount of outside light received by the light receiving unit, and a calculating unit that calculates the light intensity of outside light on the basis of the time taken for the accumulated amount of outside light received to exceed a predetermined threshold.

12 Claims, 8 Drawing Sheets

ELECTROOPTICAL APPARATUS, ELECTRONIC DEVICE, AND APPARATUS AND METHOD FOR DETECTING OUTSIDE LIGHT

BACKGROUND

1. Technical Field

The present invention relates to a technical field of an electrooptical apparatus, for example, a liquid crystal apparatus, an electronic device having such an electrooptical apparatus, and an apparatus and a method for detecting outside light used in such an electrooptical apparatus.

2. Related Art

Examples of an electrooptical apparatus include a liquid crystal apparatus in which liquid crystal is disposed between a pair of substrates as an electrooptical substance. In such a liquid crystal apparatus, liquid crystal is put in a predetermined orientation state between a pair of substrates constituting, for example, a liquid crystal panel. By applying a predetermined voltage to the liquid crystal in each pixel formed, for examples in an image display region and thereby changing the orientation and order in the liquid crystal and thereby modulating light, gradation display is performed.

It is known that the visibility in such a liquid crystal apparatus changes depending on the brightness of the surroundings (for example, the light intensity of outside light). For example, when the surroundings of the liquid crystal apparatus are relatively bright, increasing the luminance of the liquid crystal apparatus (specifically, the luminance of light from the backlight) improves the visibility. When the surroundings of the liquid crystal apparatus are relatively dark, it is not necessary to increase the luminance of the liquid crystal apparatus (specifically, the luminance of light from the backlight) to improve the visibility. To realize such a configuration, JP-A-2000-131137 discloses a technique to provide a light sensor on a substrate of a liquid crystal panel constituting a liquid crystal apparatus and to control the luminance of light from a backlight depending on the light intensity of outside light of the surroundings detected in the light sensor. JP-A-2007-72243 discloses a technique to detect the light intensity of outside light while light emission from a backlight is stopped in order to prevent deterioration in accuracy of detection of outside light caused by light from the backlight. In particular, JP-A-2007-72243 discloses stopping light emission from a backlight during a vertical blanking interval.

However, a vertical blanking interval is not constant but differs according to the model or specification of each liquid crystal apparatus. Therefore, if a vertical blanking interval is shorter than the time taken for a light sensor to detect the light intensity of outside light, the light sensor cannot detect the light intensity of outside light. If, to avoid such a technological problem, light emission from a backlight is stopped for a time longer than the time taken for a light sensor to detect the light intensity of outside light, a flicker is caused and the display quality is thereby deteriorated.

SUMMARY

An advantage of some aspects of the invention is to provide an apparatus and a method for detecting outside light, an electrooptical apparatus, and an electronic device that can detect the light intensity of outside light of the surroundings, for example, of an electrooptical apparatus without being affected by light emitted from the electrooptical apparatus itself.

Electrooptical Apparatus

According to a first aspect of the invention, an electrooptical apparatus includes a display unit that emits display light, a light emission stopping unit that stops emission of the display light in the display unit, a light receiving unit that receives outside light around the display unit while emission of the display light is stopped, an accumulating unit that accumulates the amount of outside light received by the light receiving unit, and a calculating unit that calculates the light intensity of outside light on the basis of the time taken for the accumulated amount of outside light received to exceed a predetermined threshold.

An electrooptical apparatus according to the first aspect of the invention can display an image such as a moving image or a still image on a display surface on a display unit with display light emitted from the display unit. Examples of a display unit include a liquid crystal panel that has a backlight having, for example, a light emitting diode and a pair of substrates the gap between which is filled with liquid crystal. In this case, display light corresponds to light from the backlight. Examples of a display unit also include an organic EL panel having light emitting elements that emit light themselves. In this case, display light corresponds to light from the light emitting elements. Of course, display units other than these can be used as a display unit in the first aspect of the invention as long as they are configured to display an image by emitting display light.

In the first aspect of the invention, emission of display light is stopped by a light emission stopping unit at a predetermined time, at a desired time, or at any time. Specifically, for example, a backlight is turned off or emission of display light by light emitting elements is stopped. When emission of display light is stopped, that is, during a predetermined period (that is, light receiving period) included in a period when emission of display light is stopped, a light receiving unit having, for example, a light sensor receives outside light around the display unit (in other words, environment light). At this time, since emission of display light is stopped, the light receiving unit does not receive display light. On the other hand, when emission of display light is not stopped, the light receiving unit does not receive outside light around the display unit (and display light). That is, the light receiving unit in the first aspect of the invention selectively receives outside light without selectively receiving display light.

Thereafter, an accumulating unit accumulates (in other words, integrates) the amount of outside light received by the light receiving unit. That is, the accumulating unit adds the amount of outside light received by the light receiving unit this time to the accumulated amount of outside light previously received by the light receiving unit. If emission of display light is stopped intermittently, the amount of outside light received during each of a plurality of light receiving periods is accumulated. It is preferable to use a value directly or indirectly showing the amount of outside light received or a value converted from the amount of outside light received into a predetermined physical quantity (for example, a voltage value, a charge amount, or a current value) as "the amount of outside light received" in the first aspect of the invention.

In such a process of receiving outside light, the accumulated amount of outside light received increases. In the first aspect of the invention, a calculating unit calculates the light intensity (for example, luminance) of outside light on the basis of the time taken for the accumulated amount of outside light received to exceed a predetermined threshold. Specifically, if the time taken for the accumulated amount of outside light received to exceed the predetermined threshold is relatively long, a relatively weak value is calculated as the light intensity of outside light. If the time taken for the accumulated amount of outside light received to exceed the predetermined threshold is relatively short, a relatively strong value is calculated as the light intensity of outside light.

To directly detect the light intensity of outside light in the light receiving unit, the light receiving unit needs to receive outside light for a somewhat long time. However, in an actual electrooptical apparatus, it is difficult to receive outside light for a somewhat long time. In other words, emission of display light cannot be always stopped for a time longer than the time taken for the light receiving unit to directly detect the light intensity of outside light. According to the first aspect of the invention, instead of directly detecting the light intensity of outside light in the light receiving unit, the amount of outside light received by the light receiving unit is accumulated, and the light intensity of outside light is calculated (that is, detected) on the basis of the time for the accumulated amount of outside light received to exceed the predetermined threshold. Therefore, if emission of display light cannot be stopped for a time longer than the time taken for the light receiving unit to directly detect the light intensity of outside light, the light intensity of outside light can be calculated by accumulating the amount of outside light received in a short time. That is, in the first aspect of the invention, the light intensity of outside light can be calculated by repeating an operation to stop emission of display light for a time shorter than the time taken for the light receiving unit to directly detect the light intensity of outside light.

Since emission of display light is stopped when the light receiving unit receives outside light, calculation of the light intensity of outside light is not adversely affected by display light. As a result, the light intensity of outside light can be measured with a high degree of accuracy.

As a result, as described below, the luminance of display light can be changed depending on the light intensity of outside light calculated with a high degree of accuracy without being adversely affected by display light. Therefore, the visibility of the electrooptical apparatus can be improved.

In addition, since emission of display light is stopped when the light receiving unit receives outside light, it is not necessary to provide a light blocking layer for preventing display light from falling on the light receiving unit. Therefore, a decrease in yield caused by a process to provide a light blocking layer and/or an increase in cost necessitated by providing a light blocking layer can be prevented. As a result, the yield of the electrooptical apparatus can be improved, and the cost can be reduced.

When the accumulated amount of outside light received exceeds the predetermined threshold, the amount of outside light received accumulated in the accumulating unit (that is, accumulated amount) is preferably reset (for example, initialized to zero). Thereafter, accumulation of the amount of outside light received is newly started. Since the light intensity of outside light can be calculated again, if the light intensity of outside light changes, the visibility of the electrooptical apparatus can be improved.

In an embodiment of the electrooptical apparatus of the first aspect of the invention, it is preferable that the light emission stopping unit stop emission of the display light during a blanking interval of a display signal supplied to the display unit.

According to this embodiment, since emission of display light is stopped during a blanking interval (for example, a vertical blanking interval), the above-described various advantages can be enjoyed without deteriorating the quality of an image displayed with display light.

In the first aspect of the invention, emission of display light may be stopped at any time as long as deterioration in the quality of an image displayed on the electrooptical apparatus is not significantly affect the visibility.

In another embodiment of the electrooptical apparatus of the first aspect of the invention, it is preferable that the light receiving unit supply a current corresponding to the amount of outside light received to the accumulating unit, the accumulating unit accumulate the amount of charge corresponding to the current supplied from the light receiving unit as the amount of outside light received, and the calculating unit calculate the light intensity of outside light on the basis of the time taken for the amount of charge accumulated by the accumulating unit to exceed the predetermined threshold.

According to this embodiment, the amount of outside light received can be accumulated by the accumulating unit including, for example, a capacitor, as the amount of charge corresponding to the current supplied from the light receiving unit including, for example, a light sensor. Therefore, the above-described various operations can be performed. As a result, the above-described various advantages can be enjoyed.

In the embodiment of the above-described electrooptical apparatus in which a current corresponding to the amount of outside light received is supplied from the light receiving unit to the accumulating unit, it is preferable that the electrooptical apparatus further include a switching unit that electrically connects the light receiving unit to the accumulating unit when emission of the display light is stopped, and electrically separates the light receiving unit from the accumulating unit when emission of the display light is not stopped.

In this case, a current corresponding to the amount of outside light received is not supplied from the light receiving unit to the accumulating unit when emission of display light is not stopped. Therefore, if the light receiving unit accidentally receives display light when emission of display light is not stopped, this light reception never adversely affects the calculation of the light intensity of outside light. Therefore, the light intensity of outside light can be calculated with a higher degree of accuracy.

In another embodiment of the electrooptical apparatus of the first aspect of the invention, it is preferable that the accumulating unit accumulate the amount of outside light received by the light receiving unit until the threshold is exceeded for a plurality of periods when emission of the display light is stopped.

According to this embodiment, if emission of display light cannot be stopped for a time longer than the time taken for the light receiving unit to directly detect the light intensity of outside light, the light intensity of outside light can be calculated by accumulating the amount of outside light received in a short time.

In another embodiment of the electrooptical apparatus of the first aspect of the invention, it is preferable that the calculating unit calculate the light intensity of outside light on the basis of correlation information showing the correlation between the time taken for the accumulated amount of outside light received to exceed the predetermined threshold and the light intensity of outside light.

According to this embodiment, the light intensity of outside light can be calculated with comparative ease on the basis of the correlation information preliminarily stored, for example, in a memory. Examples of correlation information include a graph, a table, a mathematical formula, and other various information showing the correlation between the time taken for the accumulated amount of outside light received to exceed the threshold and the light intensity of outside light.

In another embodiment of the electrooptical apparatus of the first aspect of the invention, it is preferable that the electrooptical apparatus further include a light emission control unit that controls the luminance of the display light on the basis of the light intensity of outside light calculated by the calculating unit.

According to this embodiment, the luminance of display light can be changed by the light emission control unit depending on the light intensity of outside light calculated with a high degree of accuracy without being adversely affected by display light. Therefore, the visibility of the electrooptical apparatus can be improved.

Electronic Device

According to a second aspect of the invention, an electronic device has the above-described electrooptical apparatus according to the first aspect of the invention (or any one of the various embodiments thereof).

Since an electronic device according to the second aspect of the invention has the above-described electrooptical apparatus according to the first aspect of the invention (or any one of the various embodiments thereof), it can enjoy the same advantages as the various advantages that the above-described electrooptical apparatus according to the first aspect of the invention enjoys. Therefore, it is possible to realize various electronic devices such as projection displays, televisions, mobile phones, electronic organizers, mobile audio players, word processors, digital cameras, viewfinder-type or monitor-direct-view-type video recorders, workstations, video phones, POS terminals, and touch panels that can enjoy the same advantages as the various advantages that the above-described electrooptical apparatus according to the first aspect of the invention enjoys.

Apparatus for Detecting Outside Light

According to a third aspect of the invention, an apparatus for detecting outside light includes a light emission stopping unit that stops emission of display light in a display unit that emits display light, a light receiving unit that receives outside light around the display unit while emission of the display light is stopped, an accumulating unit that accumulates the amount of outside light received by the light receiving unit, and a calculating unit that calculates the light intensity of outside light on the basis of the time taken for the accumulated amount of outside light received to exceed a predetermined threshold.

An apparatus for detecting outside light according to the third aspect of the invention can enjoy the same advantages as the various advantages that the above-described electrooptical apparatus according to the first aspect of the invention enjoys.

An apparatus for detecting outside light according to the third aspect of the invention can have various embodiments corresponding to the various embodiments in the above-described electrooptical apparatus according to the first aspect of the invention.

In an embodiment of the apparatus for detecting outside light of the third aspect of the invention, it is preferable that the accumulating unit accumulate the amount of outside light received by the light receiving unit until the threshold is exceeded for a plurality of periods when emission of the display light is stopped.

According to this embodiment, if emission of display light cannot be stopped for a time longer than the time taken for the light receiving unit to directly detect the light intensity of outside light, the light intensity of outside light can be calculated by accumulating the amount of outside light received in a short time.

Method for Detecting Outside Light

According to a fourth aspect of the invention, a method for detecting outside light includes stopping emission of display light in a display unit that emits display light, receiving outside light around the display unit while emission of the display light is stopped, accumulating the amount of outside light received, and calculating the light intensity of outside light on the basis of the time taken for the accumulated amount of outside light received to exceed a predetermined threshold.

A method for detecting outside light according to the fourth aspect of the invention can enjoy the same advantages as the various advantages that the above-described electrooptical apparatus according to the first aspect of the invention enjoys.

A method for detecting outside light according to the fourth aspect of the invention can have various embodiments corresponding to the various embodiments in the above-described electrooptical apparatus according to the first aspect of the invention.

In an embodiment of the method for detecting outside light of the fourth aspect of the invention, it is preferable that emission of the display light be intermittently stopped, and when the amount of outside light received is accumulated, the amount of outside light received this time be added to the accumulated amount of outside light previously received.

According to this embodiment, if emission of display light cannot be stopped for a time longer than the time taken for the light receiving unit to directly detect the light intensity of outside light, the light intensity of outside light can be calculated by accumulating the amount of outside light received in a short time.

Further features and advantages of some aspects of the invention will become apparent from the following description of embodiments.

BRIEF DESCRIPTION OF THE DRAWINGS

The invention will be described with reference to the accompanying drawings, wherein like numbers reference like elements.

DESCRIPTION OF EXEMPLARY EMBODIMENTS

The embodiments of the invention will now be described with reference to the drawings. In the following description, a liquid crystal apparatus is taken as an example of an electrooptic apparatus according to the invention.

(1) Basic Structure of Liquid Crystal Apparatus

Figure 1:
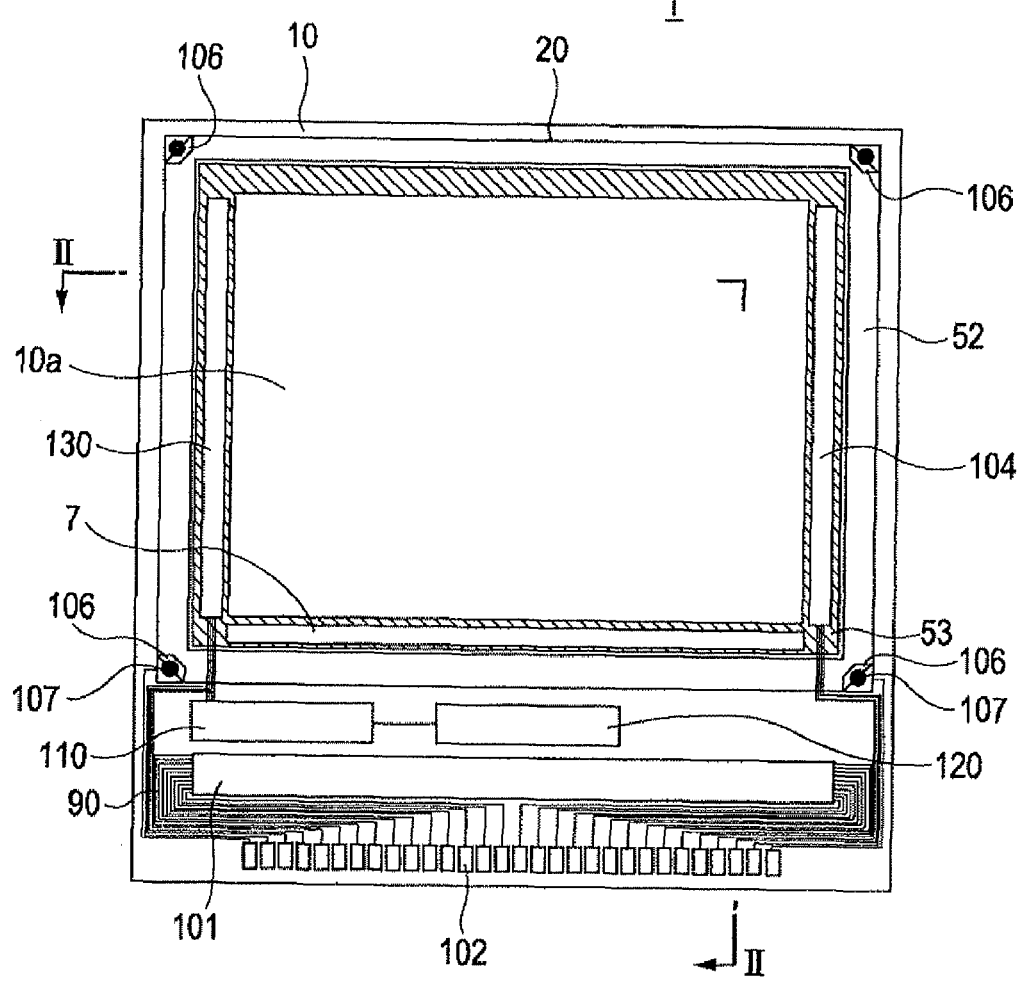
FIG. 1 is a plan view showing the structure of a liquid crystal apparatus according to an embodiment.
Figure 2:
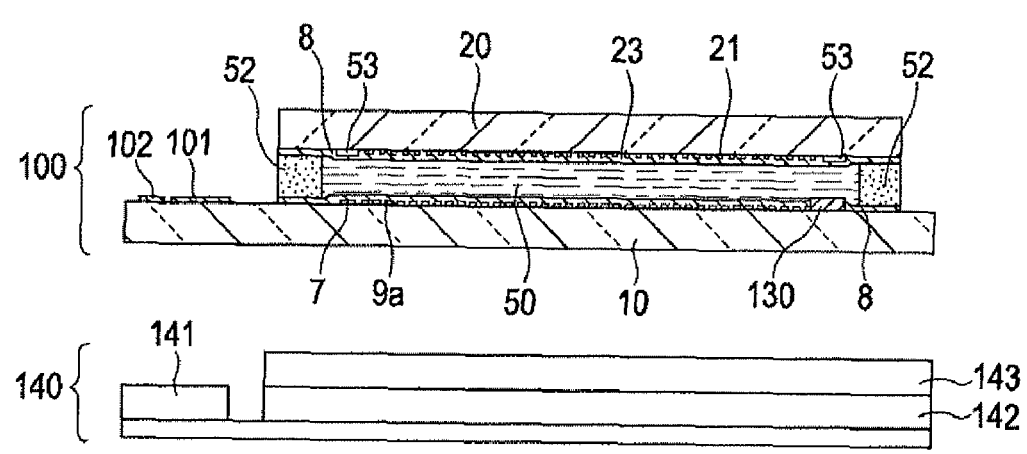
FIG. 2 is a sectional view taken along line II-II of FIG. 1.

First, the structure of a liquid crystal apparatus according to an embodiment will be described with reference to FIGS. 1 and 2. FIG. 1 is a plan view showing the structure of a liquid crystal apparatus according to the embodiment. FIG. 2 is a sectional view taken along line II-II of FIG. 1.

In FIGS. 1 and 2, in the liquid crystal apparatus 1 according to the embodiment, a TFT array substrate 10 and an counter substrate 20 are disposed opposite each other. The gap between the TFT array substrate 10 and the counter substrate 20 is filled with a liquid crystal layer 50a, and thereby a liquid crystal panel 100 is formed. The TFT array substrate 10 and the counter substrate 20 are bonded to each other with a seal material 52 provided in a frame-shaped seal region located around an image display region 10a.

In FIG. 1, inside and along the seal region where the seal material 52 is disposed, a frame-shaped light blocking layer 53 that defines a frame region of the image display region 10a and blocks light is provided on the counter substrate 20. In a part of the peripheral region outside the seal region where the seal material 52 is disposed, a data line drive circuit 101 and an external circuit connecting terminal 102 are provided along one side of the TFT array substrate 10. The data line drive circuit 101 may be provided inside the seal region in such a manner that the data line drive circuit 101 is covered by the frame-shaped light blocking layer 53. Inside the seal region along this side, a sampling circuit 7 is provided in such a manner that it is covered by the frame-shaped light blocking layer 53. A scanning line drive circuit 104 is provided inside the seal region along the two sides adjacent to this side in such a manner that it is covered by the frame-shaped light blocking layer 53. Vertical conducting terminals 106 for connecting both substrates with vertical conducting materials 107 are disposed on the TFT array substrate 10 and opposite the four corners of the counter substrate 20. Through these, electricity can be conducted between the TFT array substrate 10 and the counter substrate 20.

Inside the seal region, a light sensor portion 130 is provided in such a manner that it is covered by the frame-shaped light blocking layer 53. In the light sensor portion 130 is provided a light sensor 131 (see FIG. 3). The light sensor 131 receives outside light around the liquid crystal apparatus 1 (in other words, light entering through the viewing surface (the upper surface of the counter substrate 20)) and corresponds to "light receiving unit" in the invention. Therefore, the part of the frame-shaped light blocking layer 53 where the light sensor portion 130 is provided is configured to be able to transmit outside light. The light sensor portion 130 may be provided with one optical sensor 131 or a plurality of optical sensors 131.

On the TFT array substrate 10 is formed wiring 90 for electrically connecting the external circuit connecting terminal 102 to the data line drive circuit 101, the scanning line drive circuit 104, the vertical conducting terminals 106, and so forth.

On the TFT array substrate 10 are formed an illuminance detection circuit 110 and a backlight controller 120. The illuminance detection circuit 110 is supplied with the output of the light sensor 131 provided in the light sensor portion 130, and detects the light intensity of outside light. The backlight controller 120 adjusts the luminance of a backlight 141 on the basis of the light intensity of outside light detected in the illuminance detection circuit 110, and corresponds to "light emission control unit" of the invention. The structure and operation of the illuminance detection circuit 110 and the backlight controller 120 will hereinafter be described in detail (see FIGS. 3 and 4).

In FIG. 2, on the TFT array substrate 10 is formed a laminate structure in which are formed pixel switching TFTs (Thin Film Transistors) serving as drive elements, and wiring such as scanning lines and data lines. Pixel electrodes 9a are provided in a matrix in the image display region 10a and in a layer over the pixel switching TFTs and the wiring such as scanning lines and data lines. On the pixel electrodes 9a is formed an alignment layer 8. On the other hand, a light blocking layer 23 is formed on the surface of the counter substrate 20 facing the TFT array substrate 10. The light blocking layer 23 is formed, for example, of a light blocking metal layer and is patterned, for example, in a grid in the image display region 10a on the counter substrate 20. On the light blocking layer 23, a counter electrode 21 formed of a transparent material such as ITO is formed, facing the pixel electrodes 9a. On the counter electrode 21 is formed an alignment layer 8. The liquid crystal layer 50 is formed of one kind of nematic liquid crystal or a mixture of several kinds of nematic liquid crystal, and is put in a predetermined orientation state between the pair of alignment layers.

In addition to the data line drive circuit 101 and the scanning line drive circuit 104, although not shown, an inspection circuit, an inspection pattern, and so forth for inspecting the quality, defect, and so forth of the liquid crystal apparatus during manufacture or before shipment may be formed on the TFT array substrate 10.

The liquid crystal apparatus 1 may be configured to perform transmissive display by forming the pixel electrodes 9a, for example, of ITO. Alternatively, the liquid crystal apparatus 1 may be configured to perform transflective display by forming the pixel electrodes 9a, for example, of aluminum or disposing a reflective layer behind the pixel electrodes 9a and thereby providing the pixel electrodes 9a with both a reflective region and a transmissive region. In the embodiment, as described above, it is preferable that the liquid crystal apparatus 1 be a direct-view type in which the backlight 141 is disposed behind the liquid crystal panel.

Therefore, the liquid crystal apparatus 1 according to the embodiment has a backlight module 140. The backlight module 140 emits light from beneath the TFT array substrate 10. In the liquid crystal apparatus 1, the transmittance of light emitted from the backlight module 140 is controlled in the image display region 10a in accordance with an image signal, and thereby the display of an image is performed.

The backlight module 140 has a backlight 141 that serves as a light source and that is composed of one or a plurality of light-emitting diodes, which are point light sources. Beside the backlight 141 and under the image display region 10a of the liquid crystal panel 100 is provided a light guide plate 142. The backlight 141 is disposed on the side of the light guide plate 142 and is configured to be able to emit light into the light guide plate 142.

The light guide plate 142 is substantially plate-shaped, and is disposed in such a manner that one of the side surfaces (the entrance surface) thereof faces the light-emitting surface of the backlight 141. The light guide plate 142 is formed, for example, of transparent acrylic resin. On the three side surfaces thereof other than the side surface facing the backlight 141 are formed reflecting layers that are formed, for example, of a material having reflecting properties or scattering properties (for example, white printed layers). Light emitted from the backlight 141 falls on the side surface of the light guide plate 142 facing the backlight 141, and is guided into the light guide plate 142.

Materials of the light guide plate 142 are not limited to acrylic resin but include other transparent or light transmissive resins such as polycarbonate resin and amorphous polyolefin resin, inorganic materials such as glass, and composites of these.

The light guide plate 142 is configured to reflect and scatter incident light with reflecting layers on the bottom and side surfaces thereof, and to emit light from the top surface thereof. On the top surface of the light guide plate 142 is formed an optical sheet 143 including a diffusion sheet, a prism sheet, and so forth. The optical sheet 143 is formed on the top of the light guide plate 142 in such a manner that the image display region 10a is disposed over the optical sheet 143. Light from the light guide plate 142 is diffused and emitted upward by the optical sheet 143. Light from the optical sheet 143 enters the image display region 10a.

Figure 3:
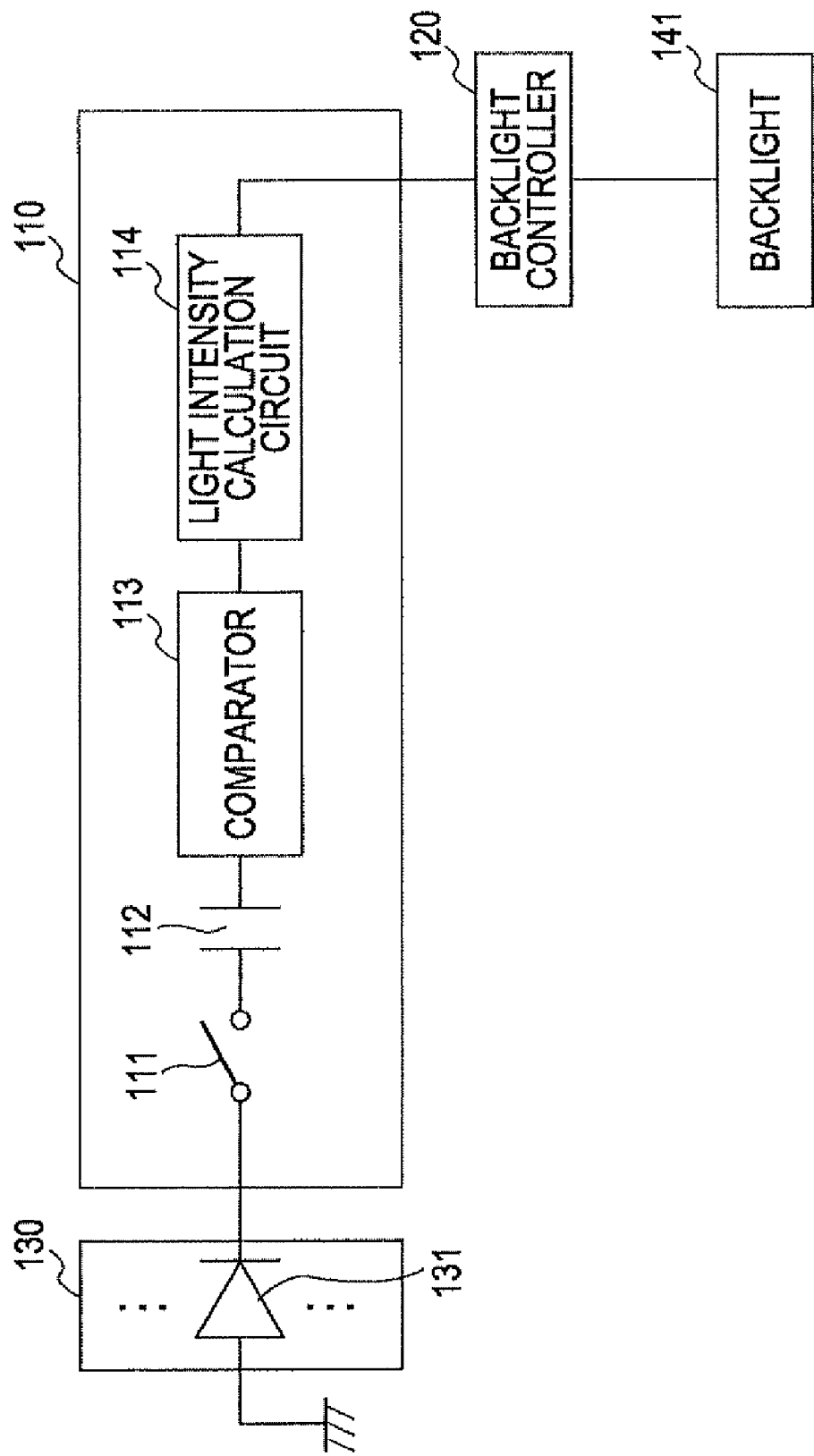
FIG. 3 is a block diagram conceptually showing the more specific configuration of the illuminance detection circuit.

Next, with reference to FIG. 3, the more specific configuration of the illuminance detection circuit 110 will be described. FIG. 3 is a block diagram conceptually showing the more specific configuration of the illuminance detection circuit 110.

As shown in FIG. 3, the illuminance detection circuit 110 has a switch 111 corresponding to "switching unit" of the invention, a capacitor 112 corresponding to "accumulating unit" of the invention, a comparator 113, and a light intensity calculation circuit 114 corresponding to "calculating unit" of the invention.

The switch 111 is configured to be able to switch on and off the electrical connection between the light sensor 131 provided in the light sensor portion 130 and the capacitor 112 in the illuminance detection circuit 110.

The light sensor 131 provided in the light sensor portion 130 outputs a leak current by detecting outside light. The capacitor 112 is configured to be able to accumulate the leak current as a charge.

The comparator 113 is configured to be able to compare the amount of charge accumulated in the capacitor 112 to a predetermined threshold. The comparator 113 is configured to be able to output the comparison result, for example, as a binary signal to the light intensity calculation circuit 114. For example, the comparator 113 may be configured to output a Low level signal when the amount of charge accumulated in the capacitor 112 is smaller than the predetermined threshold, and to output a High level signal when the amount of charge accumulated in the capacitor 112 is larger than or equal to the predetermined threshold.

The light intensity calculation circuit 114 is configured to be able to calculate the light intensity (for example, luminance) of outside light on the basis of the time taken for the amount of charge accumulated in the capacitor 112 to reach the predetermined threshold. In addition, the light intensity calculation circuit 114 is configured to be able to output the calculated light intensity to the backlight controller 120.

(2) Operation Example

Figure 4:
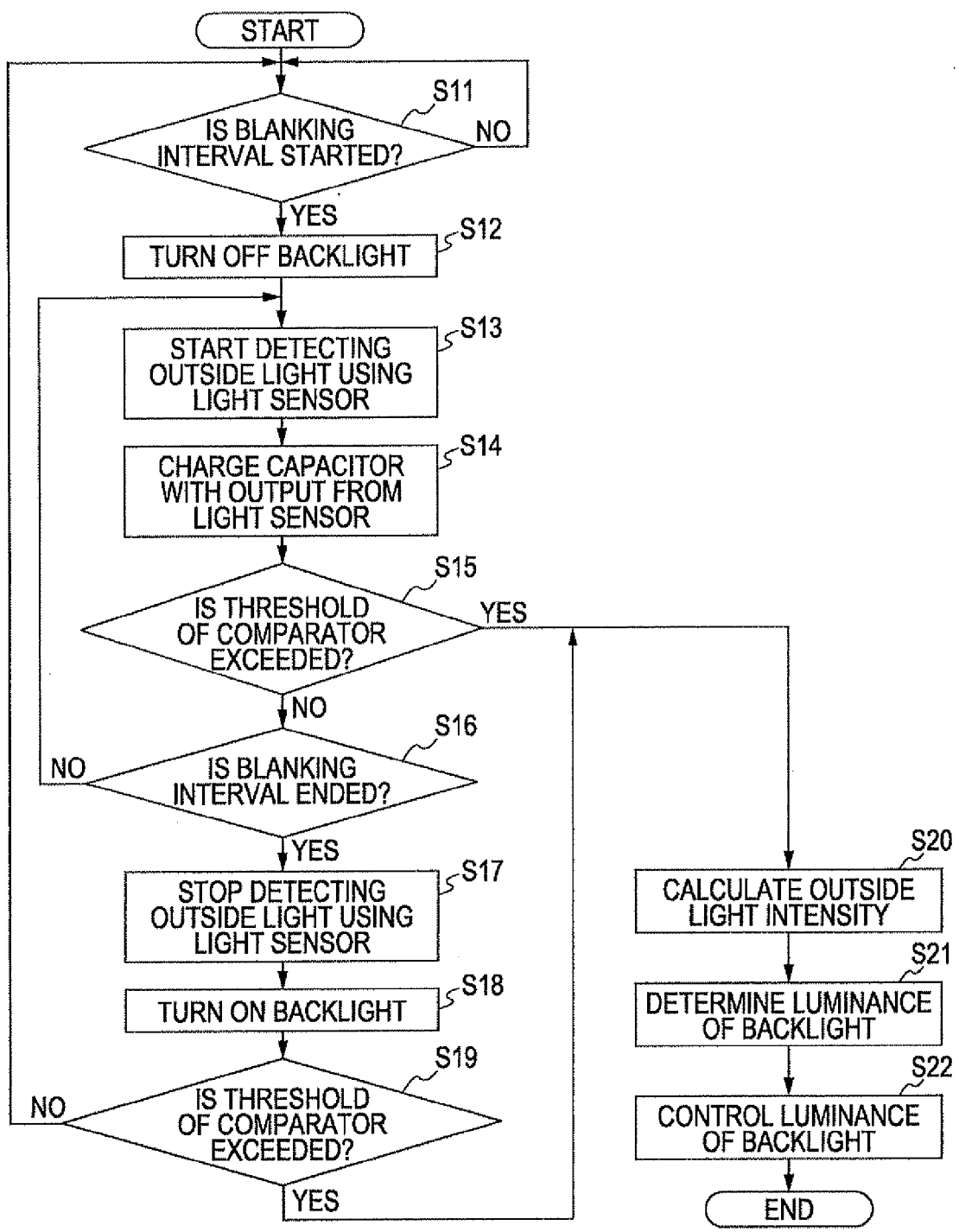
FIG. 4 is a flowchart conceptually showing the flow of the operation of the liquid crystal apparatus according to the embodiment.

Next, with reference to FIG. 4, the flow of the operation (more specifically, the operation to adjust the luminance of the backlight 141 depending on the light intensity of outside light) of the liquid crystal apparatus 1 according to the embodiment will be described. FIG. 4 is a flowchart conceptually showing the flow of the operation of the liquid crystal apparatus 1 according to the embodiment. It goes without saying that the liquid crystal apparatus 1 according to the embodiment performs the image display operation in tandem with the operation shown in FIG. 4.

As shown in FIG. 4, first, the backlight controller 120 (or a driver that controls the backlight controller 120) determines whether or riot a blanking interval (specifically, a vertical blanking interval) is started (step S11). This determination may be performed by monitoring a vertical synchronizing signal used for controlling the supply of a scanning line signal or a data line signal to each pixel.

If step S11 determines that a blanking interval is not started (step S11: No), the flow returns to step S11, and the determination of whether or not a blanking interval is started is repeated.

If step S11 determines that a blanking interval is started (step S13: Yes), the backlight controller 120 turns off the backlight 141 (step S12).

Thereafter, detection of outside light using the light sensor 131 is started (step S13). Specifically, the switch 111 electrically connects the light sensor 131 to the capacitor 112. Thereafter, a leak current that the light sensor 131 generates by detecting outside light is output to the capacitor 112. As a result, the capacitor 112 is charged with the leak current output from the light sensor 131 (that is, the leak current is accumulated in the capacitor 112 as a charge) (step S14).

While the detection of outside light using the light sensor 131 is performed, the comparator 113 determines whether or not the amount of charge accumulated in the capacitor 112 exceeds the predetermined threshold (step S15).

If step S15 determines that the amount of charge accumulated in the capacitor 112 exceeds the predetermined threshold (step S15: Yes), the output of the comparator 113 inverts, for example, from a Low level to a High level (or from a High level to a Low level). Next, detecting that the output of the comparator 113 inverts, the light intensity calculation circuit 114 calculates the light intensity of outside light (step S20). In the embodiment, the light intensity calculation circuit 114 calculates the light intensity of outside light on the basis of the time taken for the amount of charge accumulated in the capacitor 112 to exceed the predetermined threshold (that is, the time taken for the amount of charge in the capacitor 112 to increase from zero or a reference value to the predetermined threshold).

Figure 5:
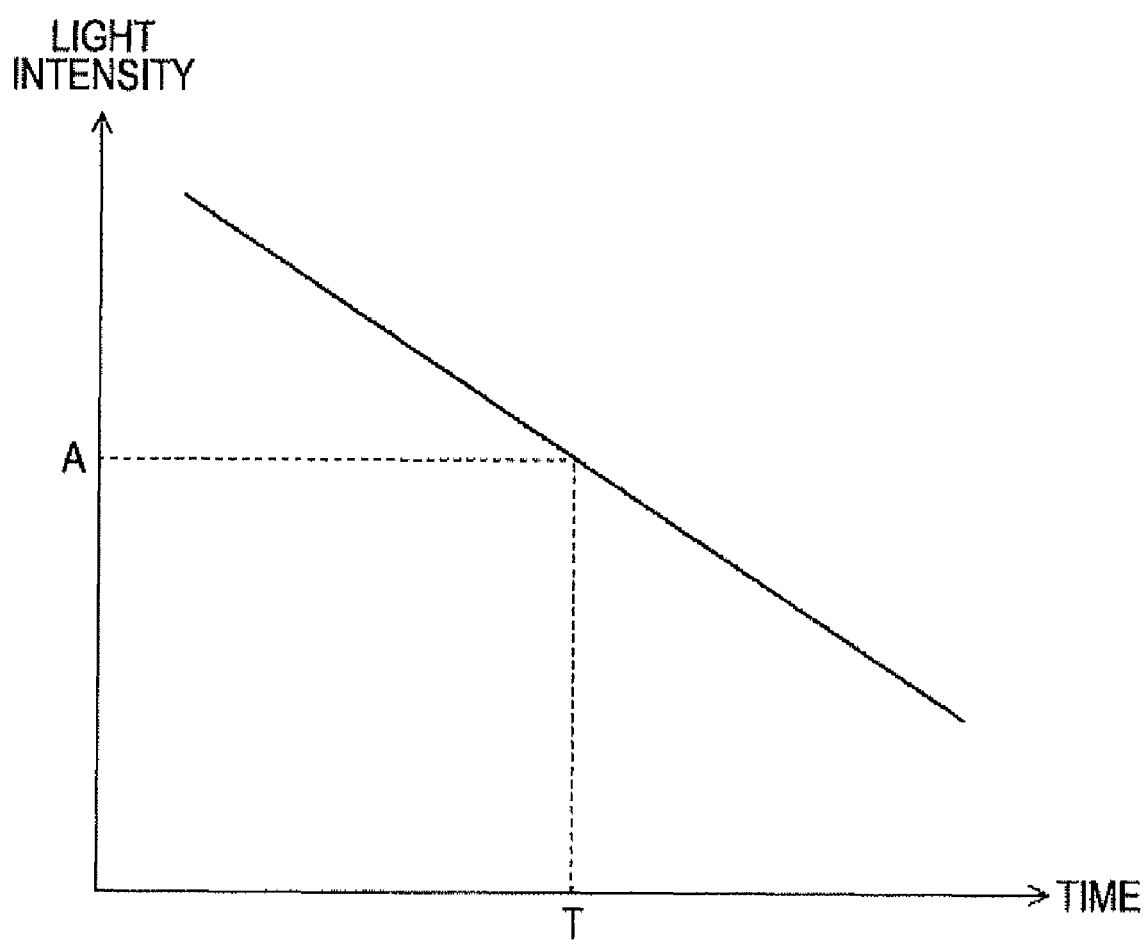
FIG. 5 is a graph showing a profile showing a correlation between the time taken for the charge amount accumulated in the capacitor to exceed the predetermined threshold and the light intensity of outside light.

How the light intensity calculation circuit 114 calculates the light intensity of outside light will be described with reference to FIG. 5. FIG. 5 is a graph showing a profile showing a correlation between the time taken for the amount of charge accumulated in the capacitor 112 to exceed the predetermined threshold and the light intensity of outside light.

In FIG. 5, the horizontal axis shows the time taken for the amount of charge accumulated in the capacitor 112 to exceed the predetermined threshold, and the vertical axis shows the light intensity of outside light. FIG. 5 shows a graph showing a profile showing a correlation between the time taken for the amount of charge accumulated in the capacitor 112 to exceed the predetermined threshold and the light intensity of outside light in such a coordinate space. The light intensity calculation circuit 114 calculates the light intensity of outside light on the basis of this profile. For example, if the time taken for the amount of charge accumulated in the capacitor 112 to exceed the predetermined threshold is "T," the light intensity calculation circuit 114 determines that the light intensity of outside light is "A."

Typically, the profile has characteristics such that if the time taken for the amount of charge accumulated in the capacitor 112 to exceed the predetermined threshold is relatively long, a relatively weak value is calculated as the light intensity of outside light, and if the time taken for the amount of charge accumulated in the capacitor 112 to exceed the predetermined threshold is relatively short, a relatively strong value is calculated as the light intensity of outside light. However, profiles having other characteristics may be used. Of course, not only a graph of a linear function shown in FIG. 5 but also profiles shown by various functions or changing variously may be used.

Such a profile may be preliminarily stored, for example, in a memory (not shown), may be generated by the liquid crystal apparatus 1, or may be generated by the user of the liquid crystal apparatus 1. The profile preliminarily stored in a memory or generated by the liquid crystal apparatus 1 or the user thereof may be modified by the liquid crystal apparatus 1 or the user thereof. Although a graph is taken as an example of a profile, it goes without saying that a table, a mathematical formula, or a mapping may be used as a profile.

Referring again to FIG. 4, next, the backlight controller 120 determines the luminance of the backlight 141 on the basis of the light intensity of outside light calculated in step S20 (step S21). Specifically, if the light intensity of outside light is relatively strong (that is, the surroundings of the liquid crystal apparatus 1 are relatively bright), the visibility is improved by increasing the luminance of light from the backlight 141, and therefore a relatively large luminance value may be determined as the luminance of the backlight 141. If the light intensity of outside light is relatively weak (that is, the surroundings of the liquid crystal apparatus 1 are relatively dark), the luminance of light from the backlight 141 need not be increased to prevent the visibility from worsening, and therefore a relatively small luminance value may be determined as the luminance of the backlight 141. In the case of transflective display, if the light intensity of outside light is relatively strong (that is, the surroundings of the liquid crystal apparatus 1 are relatively bright), it is possible to turn off the backlight 141 and to perform reflective display, and therefore the luminance of the backlight 141 may be determined to be "zero."

Thereafter, the backlight controller 120 adjusts the backlight current for driving the backlight 141, thereby adjusting the luminance of light from the backlight 141 (step S22)

After the luminance of light from the backlight 141 is adjusted in step S22 (or after the amount of charge accumulated in the capacitor 112 exceeds the predetermined threshold), the capacitor 112 may be discharged. In this case, the capacitor 112 may be discharged by supplying a reset signal serving as a trigger signal that starts discharging the capacitor 112, to the illuminance detection circuit 110.

If step S15 determines that the amount of charge accumulated in the capacitor 112 does not exceed the predetermined threshold (step S15: No), the backlight controller 120 (or a driver that controls the backlight controller 120) determines whether or not the blanking interval is ended (step S16).

If step S16 determines that the blanking interval is not ended (step S16: No), the flow returns to step S13, and the detection of outside light using the light sensor 131 is continued.

If step S16 determines that the blanking interval is ended (step S16: Yes), the detection of outside light using the light sensor 131 is stopped (step S17). Specifically, the switch 111 electrically separates the light sensor 131 from the capacitor 112. At this time, the capacitor 112 is not discharged, and accumulation is continued. Thereafter, the backlight controller 120 turns on the backlight 141 (step S18).

Next, the comparator 113 determines whether or not the amount of charge accumulated in the capacitor 112 exceeds the predetermined threshold (step S19).

If step S19 determines that the amount of charge accumulated in the capacitor 112 exceeds the predetermined threshold (step S19: Yes), steps S20 to S22 are performed. If step S19 determines that the amount of charge accumulated in the capacitor 112 does not exceed the predetermined threshold (step S19: No), the flow returns to step S11. That is, if the amount of charge accumulated in the capacitor 112 during a blanking interval does not exceed the predetermined threshold but the total amount of charge accumulated in the capacitor 112 during a plurality of blanking intervals exceeds the predetermined threshold, steps S20 to S22 are performed.

Figure 6:
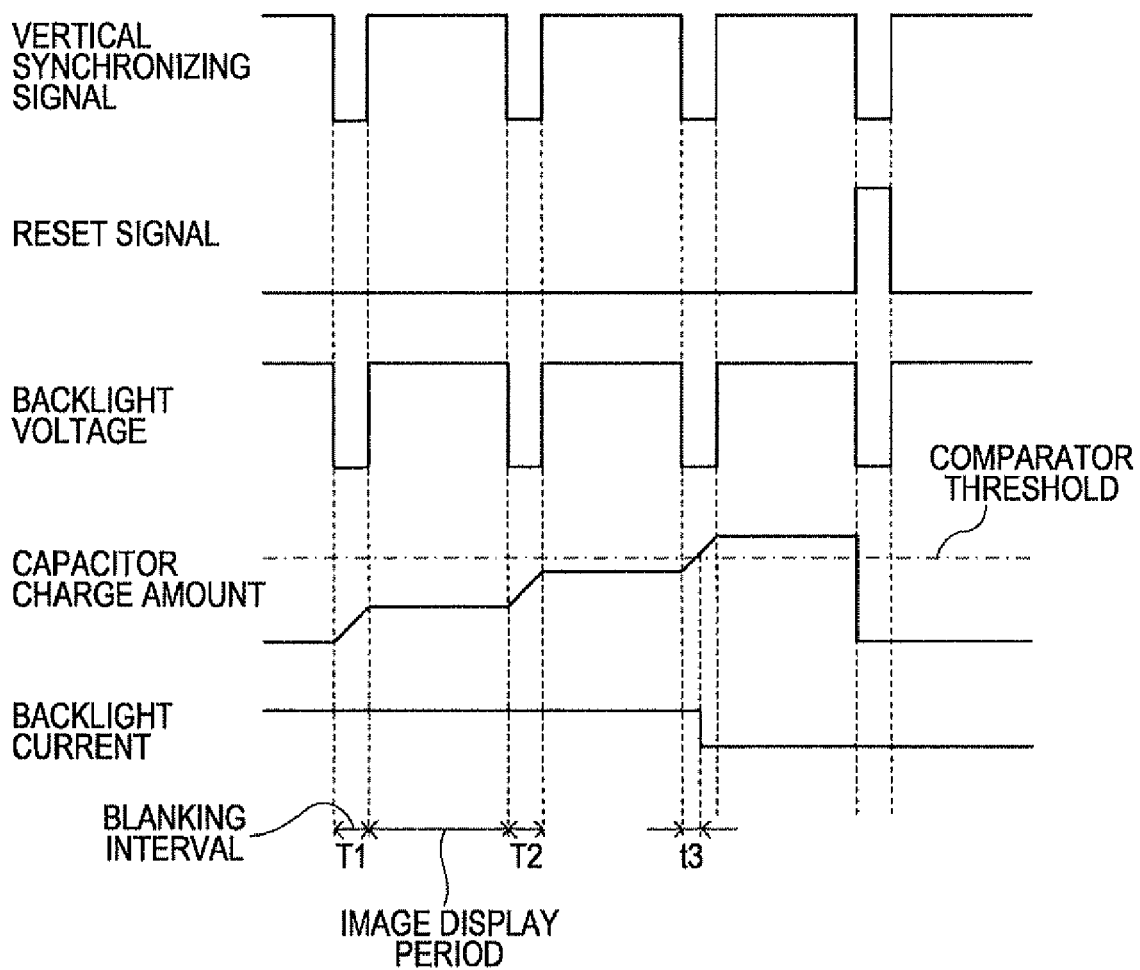
FIG. 6 is a timing chart showing the actual signal levels of a vertical synchronizing signal, a reset signal, a backlight voltage, the amount of charge accumulated in the capacitor, and a backlight current when the luminance of the backlight is reduced (that is, when the light intensity of outside light is relatively weak).
Figure 7:
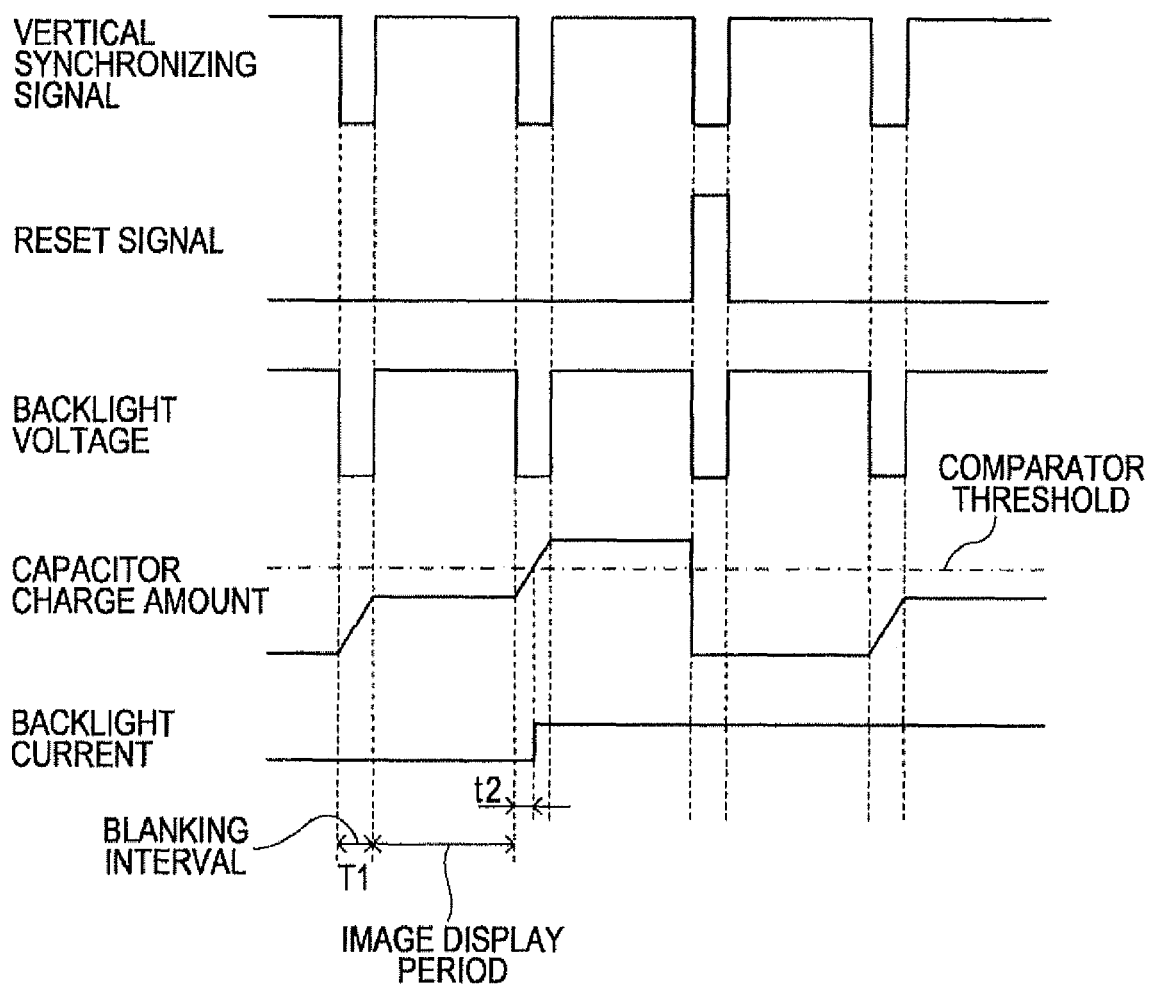
FIG. 7 is a timing chart showing the actual signal levels of a vertical synchronizing signal, a reset signal, a backlight voltages the amount of charge accumulated in the capacitor, and a backlight current when the luminance of the backlight is increased (that is, when the light intensity of outside light is relatively strong).

With reference to FIGS. 6 and 7, the operation shown in FIG. 4 will be described in relation to the actual signal levels of a vertical synchronizing signal, a reset signal, a backlight voltage, the amount of charge accumulated in the capacitor 112, and a backlight current. FIG. 6 is a timing chart showing the actual signal levels of a vertical synchronizing signal, a reset signal, a backlight voltage, the amount of charge accumulated in the capacitor 112, and a backlight current when the luminance of the backlight 141 is reduced (that is, when the light intensity of outside light is relatively weak). FIG. 7 is a timing chart showing the actual signal levels of a vertical synchronizing signal, a reset signal, a backlight voltage, the amount of charge accumulated in the capacitor 112, and a backlight current when the luminance of the backlight 141 is increased (that is, when the light intensity of outside light is relatively strong).

As shown in FIG. 6, when it is determined that a blanking interval is started on the basis of the vertical synchronizing signal, the backlight voltage is turned off and thereby the backlight 141 is turned off. At the same time, the light sensor 131 receives outside light, and the amount of charge accumulated in the capacitor 112 increases. Such an operation is repeated every blanking interval. As a result, the amount of charge accumulated in the capacitor 112 exceeds the predetermined threshold during the third blanking interval. In this example, the time taken for the amount of charge accumulated in the capacitor 112 to exceed the predetermined threshold is T1+T2+t3, from which the light intensity of outside light is calculated. Thereafter, to control the luminance of the backlight 141 on the basis of the calculated light intensity of outside light, the backlight current is reduced. The luminance of the backlight 141 is thereby reduced. In this case, it is determined that the light intensity of outside light is relatively weak (that is, the surroundings of the liquid crystal apparatus 1 are relatively dark), and the luminance of light from the backlight 141 is reduced without worsening the visibility. After the amount of charge accumulated in the capacitor 112 exceeds the predetermined threshold, a reset signal is output, and the capacitor 112 is thereby discharged.

Similarly, as shown in FIG. 7, when it is determined that a blanking interval is started on the basis of the vertical synchronizing signal, the backlight voltage is turned off and thereby the backlight 141 is turned off. At the same time, the light sensor 131 receives outside light, and the amount of charge accumulated in the capacitor 112 increases. Such an operation is repeated every blanking interval. As a result, the amount of charge accumulated in the capacitor 112 exceeds the predetermined threshold during the second blanking interval. In this example, the time taken for the amount of charge accumulated in the capacitor 112 to exceed the predetermined threshold is T1+t2, from which the light intensity of outside light is calculated. Thereafter, to control the luminance of the backlight 141 on the basis of the calculated light intensity of outside light, the backlight current is increased. The luminance of the backlight 141 is thereby increased. In this case, it is determined that the light intensity of outside light is relatively strong (that is, the surroundings of the liquid crystal apparatus 1 are relatively bright), and the luminance of light from the backlight 141 is increased so as to improve the visibility. After the amount of charge accumulated in the capacitor 112 exceeds the predetermined threshold, a reset signal is output, and the capacitor 112 is thereby discharged.

As described above, in the liquid crystal apparatus 1 according to the embodiment, the capacitor 112 is charged with a leak current generated in the light sensor 131 depending on the amount of outside light received. On the basis of the time taken for the amount of charge accumulated in the capacitor 112 to exceed the predetermined threshold, the light intensity of outside light is calculated (that is, detected).

To directly detect the light intensity of outside light in the light sensor 131, the light sensor 131 needs to receive outside light for a somewhat long time. However, in an actual liquid crystal apparatus 1, it is difficult to receive outside light for a somewhat long time. In other words, the backlight 141 cannot be always kept turned off for a time longer than the time taken for the light sensor 131 to directly detect the light intensity of outside light. For example, when outside light is received during a blanking interval as described above, the blanking interval is very short and is not always longer than the time taken for the light sensor 131 to directly detect the light intensity of outside light. In this case, the light sensor 131 cannot directly detect the light intensity of outside light as a reliable value.

In the embodiment, instead of directly detecting the light intensity of outside light in the light sensor 131, the capacitor 112 is charged with a leak current generated in the light sensor 131 depending on the amount of outside light received, and the light intensity of outside light is calculated (that is, detected) on the basis of the time for the amount of charge to exceed the predetermined threshold. Therefore, if the backlight 141 cannot be kept turned off for a time longer than the time taken for the light sensor 131 to directly detect the light intensity of outside light, the light intensity of outside light can be calculated by accumulating the amount of outside light received in a short time as a charge. That is, in this embodiment, the light intensity of outside light can be calculated by repeating an operation to keep the backlight 141 turned off for a time shorter than the time taken for the light sensor 131 to directly detect the light intensity of outside light.

Figure 8:
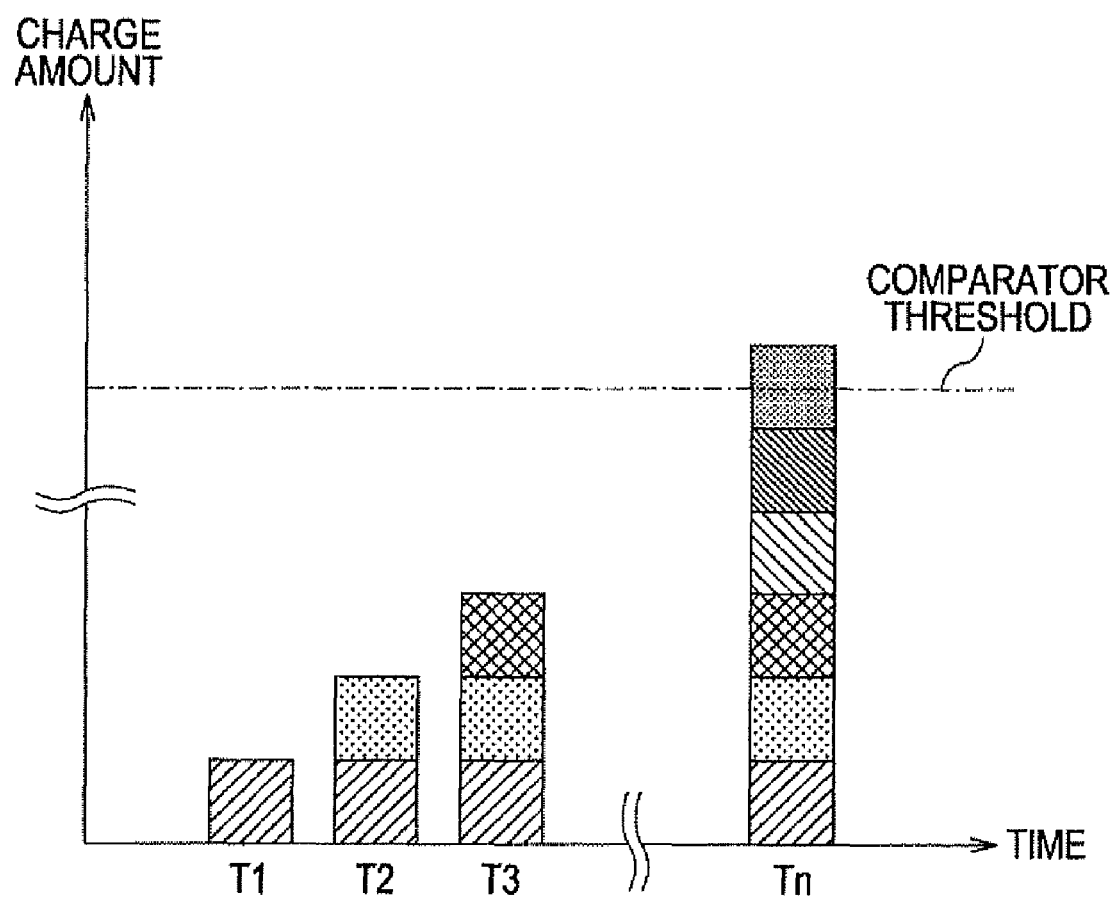
FIG. 8 is a graph showing a temporal change in the amount of charge accumulated in the capacitor.

Such a state will be described with reference to FIG. 8. FIG. 8 is a graph showing a temporal change in the amount of charge accumulated in the capacitor 112.

As shown in FIG. 8, when a period T1 has elapsed, the amount of charge accumulated in the capacitor 112 does not exceed the predetermined threshold, and therefore the light intensity of outside light is not calculated. To detect the light intensity of outside light by receiving outside light for a short time (for example, only the period T1), it is necessary to shorten the time taken for the light sensor 131 to directly detect the light intensity of outside light, by significantly increasing the sensitivity of the light sensor 131. Unfortunately, significantly increasing the sensitivity of the light sensor 131 narrows the dynamic range of the light sensor 131. In this embodiment (particularly in the example shown in FIG. 8), after a period Tn has elapsed (that is, after an operation to keep the backlight 141 turned off for a time shorter than the time taken for the light sensor 131 to directly detect the light intensity of outside light is repeated n times), the amount of charge accumulated in the capacitor 112 exceeds the predetermined threshold, and therefore at this point in time the light intensity of outside light is calculated. Therefore, the light intensity of outside light can be detected without significantly or unnecessarily changing the specification of the light sensor 131 (for example, without narrowing the dynamic range of the light sensor 131).

Since the backlight 141 is turned off when the light sensor 131 receives outside light, calculation of the light intensity of outside light is not adversely affected by light from the backlight 141. As a result, the light intensity of outside light can be measured with a high degree of accuracy.

As a result, the luminance of light from the backlight 141 can be changed depending on the light intensity of outside light calculated with a high degree of accuracy without being adversely affected by light from the backlight 141. Therefore, the visibility of the liquid crystal apparatus 1 can be improved.

In addition, since the backlight 141 is turned off when the light sensor 131 receives outside light, it is not necessary to provide a light blocking layer for preventing light from the backlight 141 from falling on the light sensor 131. Therefore, a decrease in yield caused by a process to provide a light blocking layer and/or an increase in cost necessitated by providing a light blocking layer can be prevented. As a result, the yield of the liquid crystal apparatus 1 can be improved, and the cost can be reduced.

In addition, since the light sensor 131 is electrically connected to the capacitor 112 only when the backlight 141 is turned off (that is, when the light sensor 131 receives outside light), a leak current is not supplied from the light sensor 131 to the capacitor 112 when the backlight 141 is turned on. Therefore, if the light sensor 131 accidentally receives light from the backlight 141 when the backlight 141 is turned on, this light reception never adversely affects the calculation of the light intensity of outside light. Therefore, the light intensity of outside light can be calculated with a higher degree of accuracy.

In the above description, the backlight 141 is turned off and outside light is detected during a blanking interval. However, the backlight 141 may be turned off and outside light may be detected at any time as long as the quality of an image displayed on the liquid crystal apparatus 1 is not deteriorated. For example, it is said that a user who views images can perceive images displayed at a rate of 60 Hz or less (that is, images displayed at a rate of 60 frames per second or less or at a rate of 1/60 second per frame or more). Therefore, the backlight 141 may be turned off and outside light may be detected at a rate of 1/60 second per frame or less (for example, 1/120 second per frame).

In addition, "predetermined threshold" can be set to any value as long as highly reliable light intensity of outside light can be calculated.

In the above-described embodiment, the liquid crystal panel has a vertical electric field configuration such as TN (Twisted Nematic), ECB (Electrically Controlled Birefringence), and VA (Vertical Alignment). However, also in the cases of IPS (In-Plane Switching) and FFS (Fringe Field Switching), the above-described various advantages can be enjoyed.

(3) Electronic Device

Next, an example of an electronic device having the above-described liquid crystal apparatus 1 will be described with reference to FIGS. 9 and 10.

Figure 9:
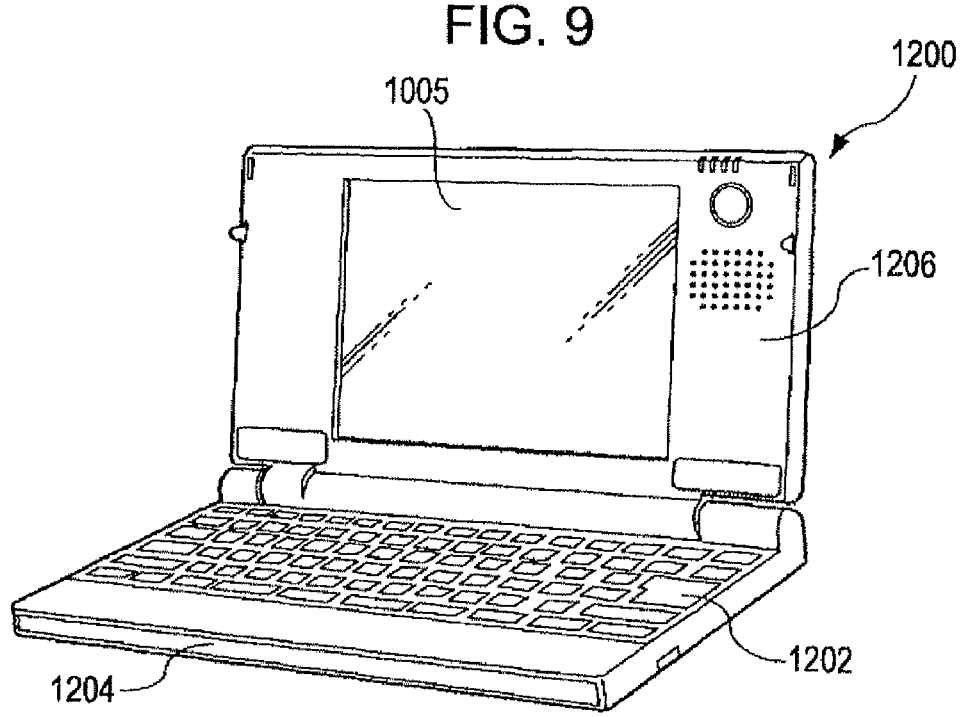
FIG. 9 is a perspective view of a mobile personal computer to which a liquid crystal apparatus is applied.
Figure 10:
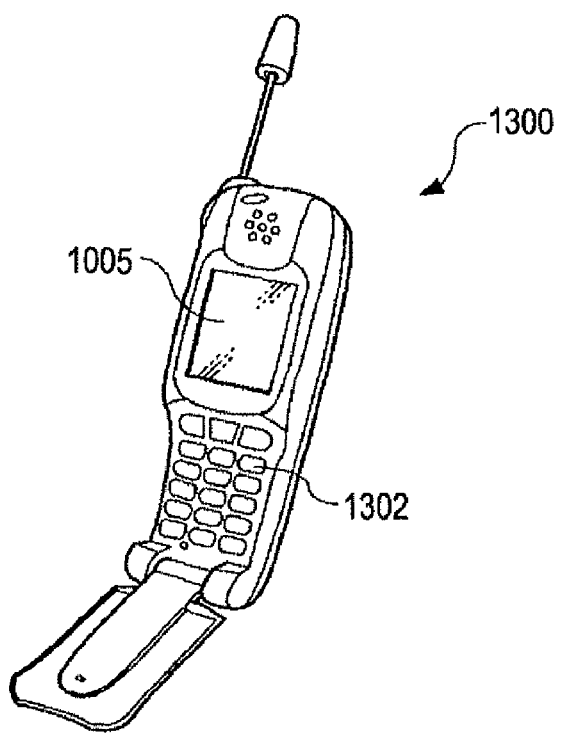
FIG. 10 is a perspective view of a mobile phone to which a liquid crystal apparatus is applied.

FIG. 9 is a perspective view of a mobile personal computer to which the above-described liquid crystal apparatus 1 is applied. In FIG. 9, a computer 1200 is composed of a main body portion 1204 having a keyboard 1202, and a liquid crystal display unit 1206 including the above-described liquid crystal apparatus 1. The liquid crystal display unit 1206 is constructed by adding a backlight to the back of the liquid crystal apparatus 1.

Next, an example in which the above-described liquid crystal apparatus 1 is applied to a mobile phone will be described. FIG. 10 is a perspective view of a mobile phone, an example of an electronic device. In FIG. 10, a mobile phone 1300 has a plurality of operation buttons 1302 and a liquid crystal apparatus 1005 that uses a transflective display method and has the same configuration as the above-described liquid crystal apparatus 1.

Also in these electronic devices, since they include the above-described liquid crystal apparatus 1, the above-described various advantages can be enjoyed.

In addition to the electronic devices described with reference to FIGS. 9 and 10, electronic devices include liquid crystal televisions, viewfinder-type or monitor-direct-view-type video tape recorders, car navigation apparatuses, pagers, electronic organizers, calculators, word processors, workstations, video phones, POS terminals, and apparatuses having a direct-view-type liquid crystal apparatus having a touch panel. It goes without saying that the above-described liquid crystal apparatus 1 can also be applied to these various electronic devices.

The invention is not limited to the above-described embodiments, and various changes may be made therein without departing from the scope or spirit of the invention set forth in the claims and the whole specification. An electrooptical apparatus, an electronic device, and an apparatus and a method for detecting outside light in which such changes are made are also included in the technical scope of the invention.

What is claimed is:

1. An electrooptical apparatus comprising:
   a display unit that emits display light;
   a light emission stopping unit that stops emission of the display light in the display unit;
   a light receiving unit that receives outside light around the display unit while emission of the display light is stopped;
   an accumulating unit that accumulates the amount of outside light received by the light receiving unit; and
   a calculating unit that calculates the light intensity of outside light on the basis of the time taken for the accumulated amount of outside light received to exceed a predetermined threshold.

2. The electrooptical apparatus according to claim 1, wherein the light emission stopping unit stops emission of the display light during a blanking interval of a display signal supplied to the display unit.

3. The electrooptical apparatus according to claim 1, wherein the light receiving unit supplies a current corresponding to the amount of outside light received to the accumulating unit, the accumulating unit accumulates the amount of charge corresponding to the current supplied from the light receiving unit as the amount of outside light received, and the calculating unit calculates the light intensity of outside light on the basis of the time taken for the amount of charge accumulated by the accumulating unit to exceed the predetermined threshold.

4. The electrooptical apparatus according to claim 3, further comprising a switching unit that electrically connects the light receiving unit to the accumulating unit when emission of the display light is stopped, and electrically separates the light receiving unit from the accumulating unit when emission of the display light is not stopped.

5. The electrooptical apparatus according to claim 1, wherein the accumulating unit accumulates the amount of outside light received by the light receiving unit until the threshold is exceeded for a plurality of periods when emission of the display light is stopped.

6. The electrooptical apparatus according to claim 1, wherein the calculating unit calculates the light intensity of outside light on the basis of correlation information showing the correlation between the time taken for the accumulated amount of outside light received to exceed the predetermined threshold and the light intensity of outside light.

7. The electrooptical apparatus according to claim 1, further comprising a light emission control unit that controls the luminance of the display light on the basis of the light intensity of outside light calculated by the calculating unit.

8. An electronic device having the electrooptical apparatus according to claim 1.

9. An apparatus for detecting outside light comprising:
   a light emission stopping unit that stops emission of display light in a display unit that emits display light;
   a light receiving unit that receives outside light around the display unit while emission of the display light is stopped;
   an accumulating unit that accumulates the amount of outside light received by the light receiving unit; and
   a calculating unit that calculates the light intensity of outside light on the basis of the time taken for the accumulated amount of outside light received to exceed a predetermined threshold.

10. The apparatus for detecting outside light according to claim 9, wherein the accumulating unit accumulates the amount of outside light received by the light receiving unit until the threshold is exceeded for a plurality of periods when emission of the display light is stopped.

11. A method for detecting outside light comprising:
   stopping emission of display light in a display unit that emits display light;
   receiving outside light around the display unit while emission of the display light is stopped;
   accumulating the amount of outside light received; and
   calculating the light intensity of outside light on the basis of the time taken for the accumulated amount of outside light received to exceed a predetermined threshold.

12. The method for detecting outside light according to claim 11, wherein emission of the display light is intermittently stopped, and when the amount of outside light received is accumulated, the amount of outside light received this time is added to the accumulated amount of outside light previously received.

* * * * *